United States Patent [19]

Fischer et al.

[11] Patent Number: 4,565,305

[45] Date of Patent: Jan. 21, 1986

[54] ROTARY VANE VALVE

[75] Inventors: John Fischer, Montgomery; Kenneth A. Heaton, Lewisburg; John W. Pfeiffer, Hughesville, all of Pa.

[73] Assignee: Koppers Company, Inc., Pittsburgh, Pa.

[21] Appl. No.: 499,783

[22] Filed: May 31, 1983

[51] Int. Cl.[4] .............................................. G01F 11/24
[52] U.S. Cl. ................. 222/368; 137/246.22; 414/219
[58] Field of Search ........................ 222/188, 368, 542; 277/3, 53, 54, DIG. 1; 414/219-220; 137/246.22

[56] References Cited

U.S. PATENT DOCUMENTS

| 1,806,515 | 5/1931 | Zoelly | 277/54 |
| 2,903,970 | 9/1959 | Elovitz et al. | 277/3 X |
| 3,109,658 | 11/1963 | Barrett et al. | 277/3 |
| 3,580,587 | 5/1971 | Born et al. | 277/3 |
| 3,580,588 | 5/1971 | Allen et al. | 277/32 |
| 3,701,537 | 10/1972 | Born et al. | 277/3 |
| 3,791,657 | 2/1974 | Bilski | 277/53 |
| 4,177,999 | 12/1979 | Raber | 277/112 |
| 4,397,657 | 8/1983 | Selep et al. | 414/220 X |

Primary Examiner—Charles A. Marmor
Attorney, Agent, or Firm—Daniel J. Long; Herbert J. Zeh, Jr.

[57] ABSTRACT

A rotary vane valve having a cylindrical housing with a pair of opposed end bells and an interior axial shaft. Opposed inlet and outlet openings on the side of the cylindrical housing allow transverse fluid flow through the housing and radial vanes project from the axial shaft to facilitate the transfer of fluid from the inlet at one pressure to the outlet at a different pressure. A pair of spaced shroud structures are fixed to the shaft at the ends of the vanes to generally separate the interior of the cylindrical housing from the end bells. These shroud structures are spaced from the cylindrical housing at their outer peripheral edges, but an annular throttle plate is spaced axially outwardly at a close distance from these shrouds and adjacent at its outer edge to the cylindrical housing to increase the velocity of purge gas flowing inwardly between the cylindrical housing and the outer peripheral edge of the shroud so that the escape of gas from the interior of the cylindrical housing is effectively prevented.

4 Claims, 3 Drawing Figures

ROTARY VANE VALVE

BACKGROUND OF THE INVENTION

1. Field of the Invention

The present invention deals with rotary vane valves and, in particular, with means for preventing fluid leaks from such valves.

2. Description of the Prior Art

Rotary vane valves are used as an airlock devices for transferring particulate solids between two regions or systems having different pressures. It is generally desirable that leakage be held to a minimum since such leakage can result in changes in pressure in either region or can constitute a hazard or create deleterious effects such as corrosion, contamination, erosion, or systemic loss of efficiency.

Typical rotary vane valves consist of a cylindrical housing, with opposed inlet and outlet openings for material, and a rotating unit within the housing having a number of pockets for transferring material from inlet to outlet, much as a revolving door permits traffic to pass from a warm area to a cold area with a minimum loss of heat. In certain rotary vane valves, the vane rotor is fitted with annular side plates, called shrouds, which are welded to the ends of the vanes. The closer the clearances between housing and rotating unit can be held, the less leakage or loss of pressure there will be.

There are many reasons why the close clearances required are often impractical, costly, and, in certain cases, even impossible to achieve. Particulate material can be trapped or entrained between rotor and housing surfaces, causing binding or abrasion, or both. Temperature gradients between housing and rotor, complemented by the fact that the masses of the two components may be significantly different, can result in differential amounts of thermal expansion and cause binding or seizure. It is also known that high pressure differentials can cause bending forces on the shaft which supports the rotor. If close clearances are used, the result is interference between the rotor and the cylindrical housing. Additionally, as the physical dimensions of such rotary vane valve units increase, the difficulty and cost of manufacture to close tolerances increases significantly.

In order to avoid leakage without the necessity of using such close tolerances, it has been suggested that the cylindrical housing be fitted on each of its ends with gas tight end bells, and that pressurized air of another gas be introduced into the space inside these end bells. This so-called "purge" gas is maintained at a pressure somewhat higher than that which exists across the rotor, and its purpose and effect is to prevent migration of particulate matter being handled in the rotary valve from migrating across the rim of the rotor shrouds into the end bells. Not only would the particulate matter eventually fill up the end bells, but also it can cause severe friction and wear on the rims of the rotor shrouds and on the housing surfaces which face the shroud rims.

If there were no purge applied to the end bells, air or gas which the valve is intended to seal against would tend to flow across the rim of the shrouds into the end cavities, toward the region of lower pressure, i.e., from the discharge port to the inlet port in the case where the discharge port was exposed to greater pressure. At the inlet, the flow would be back across the shroud rims, again carrying particulate matter. The purge not only tends to keep the interface between rim of shroud and housing surface relatively free of particles, but also imposes a limitation on leakage, if it does not curtail it altogether.

The rate of air or gas flow, Q(cfm) follows the theory of flow through orifices and is proportional to orifice area and to the square root of the differential pressure across the orifice. Considering that the orifice in this case is that formed by the clearance between the shrouds and the cylindrical housing, the relationship $$Q = K A_{orifice} \sqrt{\Delta P}$$

is applicable regardless of which direction the gas flow takes. The use of an air or gas purge flow, it can be seen, not only minimizes friction and wear that can be caused by migrating particles, but also reduces leakage.

As the physical size of the rotary valve increases, the manufacturing and operating problems involving close clearances become more pronounced and more costly. The problems of leakage likewise become more significant and the amount of purging necessary to prevent such leakage will also increase. It will be appreciated that increases in purging requirements will also be necessitated as requirements for differential pressure capability grow greater, or as the temperature to which the valve is exposed becomes higher, or as a result of any combination of the above mentioned factors. It will also be appreciated that the purging of the ends bells is an energy-intensive procedure which may also involve a relatively heavy investment in purging equipment. Furthermore, since it is often necessary that a relatively inert fluid such as nitrogen or steam be used as the purging media instead of air, this procedure may also be relatively cost-intensive. It is, therefore, the object of the present invention to provide a rotary vane valve in which leakage of process fluids and particulate material into the end bell areas is effectively controlled while the high costs heretofore associated with purging gas devices are in a large part avoided.

SUMMARY OF THE INVENTION

The present invention is a rotary vane valve equipped with shrouds at the end of its vanes in which an annular throttle plate is positioned axially outwardly from at least one of the shrouds so that this annular throttle plate is not actually in contact with the shroud but is closely spaced from it. The outer peripheral edge of this annular throttle plate is adjacent the cylindrical housing such that it either actually abuts that housing or so that there is only a small gap between this peripheral edge and the cylindrical housing. At the inner edge of the annular throttle plate a purge gas is introduced into the gap between the shroud and the throttle plate. This purge gas flows first radially outwardly in this gap and then axially inwardly in the gap between the outer peripheral edge of the shroud and the cylindrical housing.

With regard to viscous flow between parallel plates, it is known that pressure drop varies inversely as the cube of the spacing between the plates and directly with the length of the flow passage. Thus, because of the relatively narrow gaps between the annular throttle plate and the shroud and the peripheral edge of shroud and the cylindrical housing, gas velocity will be relatively high as will pressure drop between the inner edge of the annular throttle plate and the interior of the cylindrical housing.

Those skilled in the art will also appreciate that from the known relationships applicable to viscous flow between parallel plates, it would be possible to calculate the particular distance between the annular throttle plate and the shroud which would be preferred under a certain set of circumstances. Since the pressures inside the cylindrical housing are often unpredictable and variable, it is preferable that a means be provided to adjust the distance between the shroud and the annular control plate.

The outwardly-facing surfaces of the moving rotor shrouds and/or the inwardly-facing surfaces of the stationary annular plates may be provided with smooth surface finishes or may be artifically roughened by any suitable process to increase the frictional resistance to flow between the plates. The facing plate surfaces could also be machined with intermeshing alternating ridge and groove configurations in their surfaces to prevent straight-line flow of gas in the gap, which effect would also increase total seal resistance to flow.

BRIEF DESCRIPTION OF THE DRAWINGS

The invention is further described in the accompanying drawings in which.

DETAILED DESCRIPTION

Figure 1:
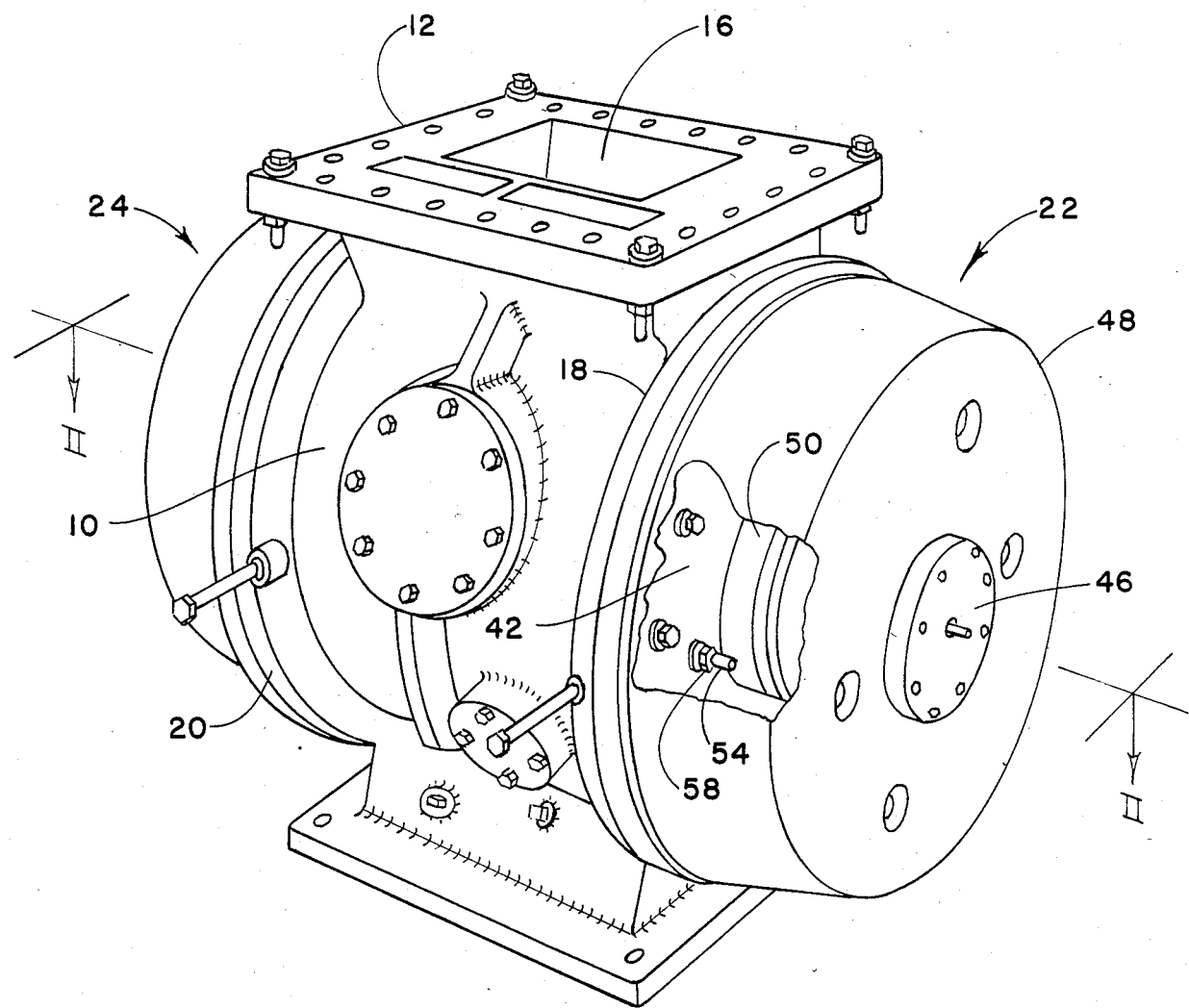
FIG. 1 is a partially cut away perspective view of a rotary vane valve representing a preferred embodiment of the present invention.

Referring to the drawings, it will be seen that the rotary vane valve of the present invention includes a generally cylindrical housing 10. This cylindrical housing has on its opposed sides an upper flange 12, by means of which the valve may be attached to a first line (not shown) at one pressure, and a lower flange 14, by means of which the valve may be attached to a second line (not shown) at a different pressure. There is a central inlet opening 16 in the upper flange and an outlet opening (not shown) in the lower flange so that fluid and particulate flow is established when the rotor is turned transversely across the interior of the cylindrical housing from the first line to the second line. On the opposed ends of the cylindrical housing there are end flanges 18 and 20 which are attached, respectively, to end bells 22 and 24 which enclose the terminal ends of the cylindrical housing section.

A central longitudinally axial shaft 26 is positioned within the cylindrical housing and extends outwardly therefrom into the end bells to be mounted at its ends at bearings 28 and 30 so that this shaft is rotatable about its longitudinal axis. At one end the shaft has a keyed extension 32 so that it can be attached to a drive means (not shown). A pair of axially spaced, annulus-shaped shroud members 34 and 36 are welded at their inner edges to the shaft and project transversely and radially outwardly therefrom near the opposed terminal edges of the cylindrical housing so their outer edges are spaced from the cylindrical housing. A plurality of longitudinal vanes as at 36 and 38 also project radially from the shaft. Adjacent their terminal ends these vanes have a plurality of apertures by means of which replaceable tips (not shown) may be bolted on to them. As is known in the art, these vanes form a plurality of chambers in which fluid is conveyed from the inlet opening to the outlet opening as the shaft is rotated by the drive means.

End bell 22 includes an inner wall 42 which is fixed to the end flange 18 of the cylindrical housing, an outer wall 44, a bearing housing 46 and generally cylindrical peripheral wall 48. The shaft 26 passes through the inner wall 42 and an annular packing retaining structure 50 is radially interposed between the shaft and the inner wall. It will be noted that end bell 24 is similarly configured and it will be understood that the features of end bell 22 described hereafter will also be included in end bell 24.

Figure 3:
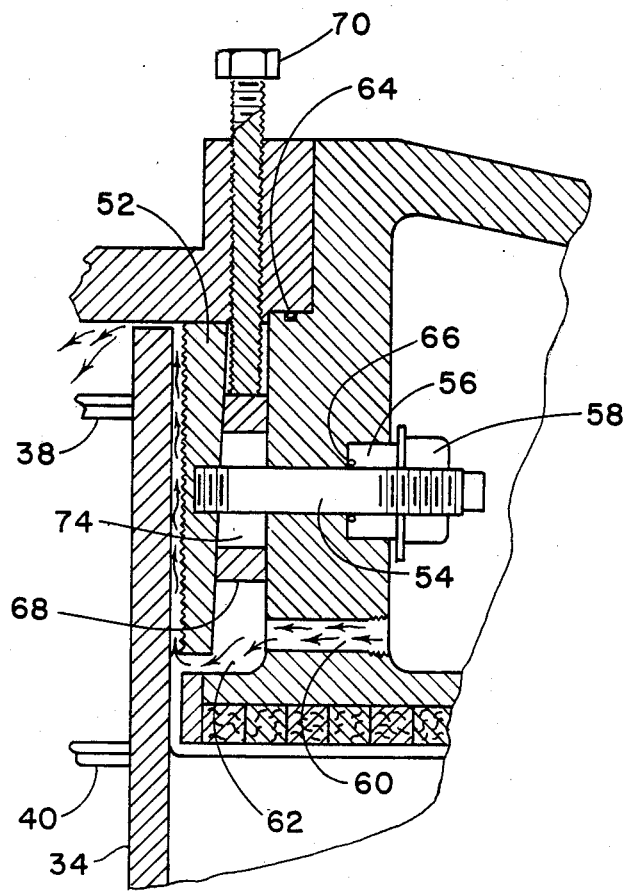
FIG. 3 is an enlarged view of the area within circle III in FIG. 2.

Referring particularly to FIG. 3, it will be seen that a throttle plate 52 is spaced axially outwardly from the shroud 34 between that shroud and the inner wall 42 of the end bell 22. This throttle plate is fixed to the end of threaded stud 54 which is retained in position by means retainer 56 and nut 58. The throttle plate may be grooved or will otherwise be suitably roughened. A purge gas inlet passageway 60 passes through the inner wall 42 and at its outer end is threaded so as to be connectable to a purge gas line (not shown). At the inner end of this purge gas passageway there is an annular purge gas collection chamber 62 which is adjacent to the inner edge of the annular throttle plate and from where purge gas first flows radially outwardly in the narrow gap between the throttle plate and the shroud and then axially inwardly in the narrow gap between the outer edge of the shroud and the cylindrical housing. When the gap between the shroud and the annular throttle plate is sufficiently narrow, a relatively small amount of purge gas introduced at a relatively low pressure may be used to prevent outward fluid flow from the interior of the cylindrical housing. So that the purge gas remains in its desired path of flow O-rings as at 64 and 66 are also provided.

Figure 2:
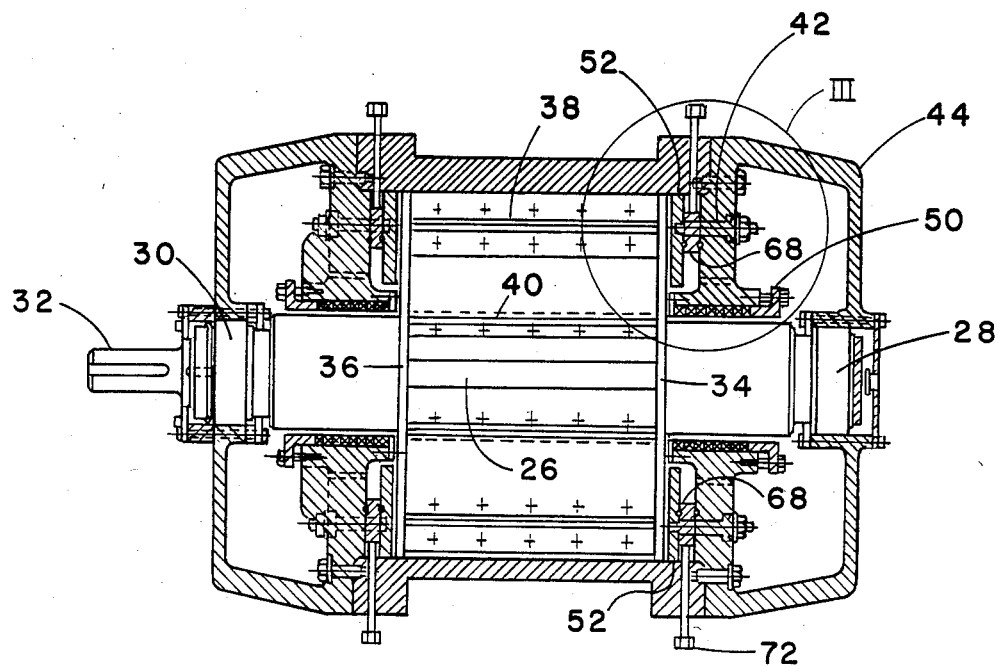
FIG. 2 is a cross sectional view of the rotary vane valve of the present invention taken through line II—II in FIG. 1.

The gap between the shroud 34 and the annular throttle plate may also be adjusted by means of a wedge-shaped, annular sliding adjusting plate 68 which is moved by adjusting bolt 70 and a second adjusting bolt 72 (FIG. 2). The wedge shaped, annular sliding adjusting plate 68 continuously abuts the throttle plate 52. The adjusting plate 68 is also thinnest at its top where it abuts adjusting bolt 70. It increases in thickness toward its lower side and is thickest at the point where it is abutted by the adjusting bolt 72. Thus, when adjusting bolt 70 is tightened and adjusting bolt 72 is loosened, the adjusting plate 68 will be moved downwardly so as to increase the gap between the throttle plate 52 and the shroud 34. When the adjusting bolt 70 is loosened and the adjusting bolt 72 is tightened, the adjusting plate 68 will be moved upwardly to decrease the gap between the throttle plate 52 and the shroud 34. It will be observed from the drawing that the throttle plate 52 is also preferably wedge-shaped to accomodate the above described motion and to allow the gap between itself and the shroud to be uniform over its entire height. It will be noted that adjusting bolt 72 is displaced from bolt 70 by about 180°. It wll also be noted that stud 54 passes through an aperture 74 in adjusting plate 68. This aperture is elongated to allow the upward and downward sliding motion of the adjusting plate. There are also three other apertures (not shown) in the adjusting plate which are situated at 90° intervals from one another and which are similarly elongated to allow movement of the adjusting plate past fastening means similar to stud 54.

It will be appreciated that an inexpensive, simple and effective means for controlling gas flow across the outer periphery of the shroud in a rotating vane valve has been described. The need for a close fit between the periphery of the shroud and the cylindrical housing is eliminated as are problems involving temperature differential and shaft deflection.

Although the invention has been described herein with a certain degree of particularity, it is to be understood that the present disclosure has been made only as an example and that the scope of the invention is defined by what is hereinafter claimed.

What is claimed is:

1. In a rotary vane valve comprising a generally cylindrical housing section with opposed side fluid inlet and outlet openings allowing transverse fluid flow through said cylindrical housing section; a pair of end bell sections enclosing the opposed terminal ends of the cylindrical housing section; a central, longitudinally axial shaft positioned within the cylindrical housing section and extending outwardly therefrom to be mounted in bearings contained in said end bell sections so as to be rotatable about its longitudinal axis; a pair of spaced, transversely oriented annular shroud members fixed at their inner edges to the shaft and extending radially outwardly therefrom so as to be spaced at their outlet peripheral edges from the cylindrical housing section and a plurality of longitudinally oriented vanes radially projecting from the shaft and being spaced from the cylindrical housing at their terminal ends, wherein the improvement comprises:

(a) at least one annular throttle plate having an inner edge and an outer peripheral edge and being spaced axially outwardly from one of the shrouds and positioned at its outer peripheral edge adjacent to the cylindrical housing section;

(b) means for introducing a purge gas at the inner edge of the annular throttle plate between said annular throttle plate and the shroud, such that said purge gas flows first radially outwardly between said annular throttle plate and said shroud and then axially inwardly between the outer peripheral edge of said shroud and the cylindrical housing section; and (c) a wedge-shaped, annular sliding adjusting plate laterally abutting the throttle plate, and first and second generally opposed, radially oriented bolts bearing end wise against said adjusting plate to radially displace said plate by their oppositely directed radial motion and thus adjust the axial distance between the throttle plate and said adjacent shroud.

2. The rotary vane valve as defined in claim 1 wherein the annular throttle plate is roughened on its inward surface.

3. The rotary vane valve as defined in claim 1 wherein the shroud is roughened on its outward surface.

4. The rotary vane valve as defined in claim 1 wherein the inward surface of the annular throttle plate and the outward surface of the shroud have a plurality of intermeshing alternating ridge and groove configurations.

* * * * *